United States Patent [19]

Masubuchi et al.

[11] Patent Number: 4,965,985
[45] Date of Patent: Oct. 30, 1990

[54] BAG MAKING, FILLING, AND PACKAGING METHOD AND APPARATUS

[75] Inventors: Norio Masubuchi; Heiemon Akiyama, both of Chiba, Japan

[73] Assignee: Tokyo Automatic Machinery Works, Ltd., Tokyo, Japan

[21] Appl. No.: 301,123

[22] Filed: Jan. 25, 1989

[30] Foreign Application Priority Data

Jun. 28, 1988 [JP] Japan ................. 63-162042

[51] Int. Cl.$^5$ ................ B65B 7/06; B65B 51/30; B65B 51/32
[52] U.S. Cl. .................................. 53/479; 53/373
[58] Field of Search ............. 53/373, 450, 451, 479, 53/551, 552, 576

[56] References Cited

U.S. PATENT DOCUMENTS

| | | |
|---|---|---|
| 2,747,346 | 5/1956 | Tigerman et al. ............ 53/450 |
| 3,326,097 | 6/1967 | Lokey .................. 53/552 X |
| 3,449,889 | 6/1969 | Molitor, Jr. ............ 53/552 X |
| 4,074,504 | 2/1978 | Greenawalt et al. ......... 53/451 X |
| 4,106,261 | 8/1978 | Greenawalt .............. 53/450 X |
| 4,350,003 | 9/1982 | Greenawalt et al. ........ 53/373 X |
| 4,485,613 | 12/1984 | Saur .................... 53/551 |
| 4,532,753 | 8/1985 | Kovacs ................. 53/552 X |
| 4,656,818 | 4/1987 | Shimoyama et al. ......... 53/551 |
| 4,719,741 | 1/1988 | Mabry ................. 53/551 X |
| 4,779,400 | 10/1988 | Hoskinson et al. ......... 53/552 X |

FOREIGN PATENT DOCUMENTS 50-78487  6/1975  Japan .

Primary Examiner—Robert L. Spruill
Assistant Examiner—Beth Bianca
Attorney, Agent, or Firm—Sandler, Greenblum & Bernstein

[57] ABSTRACT

A method and apparatus for sealing and closing an end of a sleeve, more particularly an apparatus and method for bag making, filling, and packaging for intermittently delivering a packaging film of a predetermined length, while forming the film into a tubular shape by a bag making cylindrical body; filling the tubular packaging film with a material to be packaged; and clamping the tubular film by closing a pair of opposed sealing devices to heat seal the tubular film. Apparatus is provided for cooling the heat sealed end of the tubular film by a device which is independent of the sealing device. The heat sealed end of the tubular sleeve is positioned and directly engaged by the cooling members which serves to shorten the cooling time, yet provides an improved seal with an improved appearance.

28 Claims, 4 Drawing Sheets

/ 965,985

BAG MAKING, FILLING, AND PACKAGING METHOD AND APPARATUS

BACKGROUND OF THE INVENTION

1. Field of the Invention

The present invention relates to a bag making apparatus and, more particularly, to a bag making, filling and packaging apparatus including means for intermittently delivering a packaging film of a predetermined length, while forming the film into a tubular film by a bag making cylindrical body; filling the tubular packaging film with a material to be packaged; and clamping the tubular film by closing a pair of opposed transverse sealing devices to heat seal the tubular film in the width direction. More particularly, the invention relates to such an apparatus in which a sealed portion of the packaging film is cooled after heat sealing.

2. Description of Background and Pertinent Information

Bag making, filling and packaging apparatus of the above-mentioned type have been known. For instance, Japanese Laid-Open Patent Application (KOKAI) No. 50-78487 (1975) discloses an apparatus in which blow-off ports are provided on the upper and lower sides of transverse sealing devices, the ports being opened toward a sealed portion of a packaging film, and cooling air is blown from the blow-off ports immediately after heat sealing, thereby cooling the sealed portion.

3. Problems Solved by the Invention

In such a conventional bag making, filling and packaging apparatus, however, each of the blow-off ports is disposed remote from the transverse sealing device so as not to interfere with the forward and backward movements of the sealing devices. Consequently, a relatively long time is taken to completely cool the sealed portion and a high-speed operation of the apparatus cannot be achieved. In addition, shortening the cooling time to obviate this problem results in incomplete cooling, which tends to cause delamination of the sealed portion, particularly where the material to be packaged is heavy.

This type of bag making, filling and packaging apparatus has the further problem that the surface of the sealed portion is rugged, and is not smooth, resulting in a poorer appearance and a further lowered sealing effect.

SUMMARY OF THE INVENTION

In view of the problems mentioned above in the prior art, the present invention is directed to an apparatus for sealing and closing an end of a sleeve including a heat sealing device for sealing a first portion of the end of the sleeve for closing the end of the sleeve, in which a device is provided for cooling the end of the sleeve after it has been heat sealed. The invention particularly includes an apparatus for driving the heat sealing device toward and away from the end of the sleeve as well as a separate driving device for moving the cooling device toward and away from the end of the sleeve. After the end of the sleeve has been heat sealed but before it has been cooled, a device is provided to move the end of the sleeve proximate the cooling device, after which the cooling device is moved toward the end of the sleeve.

According to a further aspect of the present invention, the cooling device is configured and arranged to directly contact the end of the sealed sleeve.

According to a further aspect of the present invention, the cooling device includes at least one cooling member having a passage therein for a liquid or gaseous cooling fluid for cooling the cooling member.

According to a still further aspect of the present invention, the cooling device includes a pair of opposed cooling members which are operatively associated with the apparatus for driving the cooling members for movement between an extended cooling position, in which the pair of cooling members are moved together and the end of the sleeve is engaged between the pair of cooling members, and a retracted position, in which the pair of cooling members are moved apart from the extended position.

According to a still further aspect of the present invention, a mechanism is provided for moving the end of the sleeve to a position adjacent the cooling device after the end of the sleeve has been sealed.

According to a still further aspect of the present invention, the sleeve of material is fed along a feeding passage by an apparatus which is either independent of or, alternatively, comprises the device for moving the end of the sleeve adjacent the cooling device.

In the embodiment in which the device for moving an end of the sleeve of material adjacent the cooling device is separate from the feeding apparatus, the moving device can be mounted for movement transverse of the feeding passage, which thereby retracts the end of the sleeve from along the feeding passage.

Alternatively, when the moving device and feeding apparatus are the same, after the end of the sleeve has been sealed, it is then moved a predetermined about along the direction of the feeding passage to its position adjacent the cooling device.

According to a still further aspect of the present invention, the moving device can be mounted for movement on a portion of the cooling device so that the cooling device engages the sleeve before the portion of the cooling device engages the sleeve.

According to a still further aspect of the present invention, an apparatus is provided for intermittently feeding a continuous length of the sleeve of material.

According to a still further aspect of the present invention, a device is provided for clamping a further portion of the sleeve upstream of the sealed portion. The sleeve is then cut downstream of the clamping device for defining the end of the sleeve. By this means, an upstream end of a downstream sleeve is defined, wherein the apparatus further includes a device for sealing and cooling the upstream end of the downstream sleeve.

According to a still further aspect of the present invention, the apparatus includes, located upstream of the clamping device, a device for supporting an outer surface of the sleeve and for holding material inserted within the sleeve.

The present invention is further directed to a bag making apparatus including a device for intermittently delivering a packaging film by a predetermined length while forming the film into a tubular shape by a bag making cylindrical body and for permitting the tubular packaging film to be filled with a packaging material. The apparatus includes a transverse sealing device on either side of a feeding passage for the packaging film, and a drive device for moving the sealing devices toward and away from the feeding passage. Further, a pair of opposed cooling members are provided adjacent the transverse sealing devices, and a second drive device is provided for moving the cooling members toward and away from the feeding passage. This second drive device is separate from the first device provided for the sealing devices. Further, a feeding device is provided for moving a portion of the packaging film to be sealed to a position between the cooling members and the transverse sealing devices are moved away from the feeding passage.

According to a further embodiment of the invention, the pair of cooling members are located on an upstream-side of the transverse sealing devices, wherein the feeding device is a tuck-up guide located on the upstream side of the cooling members which is advanced into and retracted from the feeding passage for the packaging film in conjunction with the cooling members.

According to an alternative embodiment, the pair of cooling members are disposed on the downstream-side of the transverse sealing devices, and the feeding device is a delivery belt disposed on the outer periphery of the bag making cylindrical body, the delivery belt being moved in the packaging film delivery direction when the portion to be sealed is moved.

According to a further alternative embodiment, the pair of cooling members are disposed on the upstream-side of the transverse sealing devices, and the feeding device is a delivery belt disposed on the outer periphery of the bag making cylindrical body, the delivery belt being moving in the direction opposite to the packaging film delivery direction when the portion sealed is to be moved.

The method of the present invention includes positioning a sleeve of material along a feeding passage; heat sealing an end of the sleeve with a heat sealing device; moving the heat sealed end of the sleeve proximate a cooling device; and moving a cooling device toward the heat sealed end of the sleeve for cooling the end of the sleeve.

Further according to the method of the invention, the heat sealing device is moved away from end of the sleeve before the step of cooling the heat sealed end of the sleeve is completed.

Still further according to the method of the invention, the step of moving the cooling device includes engaging the heat sealed end of the device with the cooling device.

Still further according to the method of the invention, the step of moving the heat sealed end of the sleeve proximate a cooling device includes feeding a portion of the sleeve, located upstream of the heat sealed end, transverse of the feeding passage.

According to one embodiment of the method, the step of positioning the sleeve includes feeding the sleeve in a downstream direction along the feeding passage.

Further according to this embodiment, the step of moving the heat sealed end of the sleeve proximate a cooling device includes moving the sleeve in the downstream direction.

Alternatively, the step of moving the heat sealed end of the sleeve proximate a cooling device includes moving the sleeve in a direction opposite to the downstream direction.

The method of the present invention can be characterized as a method of making, filling, and packaging a bag, including moving a pair of opposed heat sealing members toward each other for heat sealing an end of a length of a sleeve of packaging material; moving the heat sealed end of the sleeve proximate a cooling device separate from the heat sealing members; engaging the heat sealed end of the sleeve with the cooling device; supporting a portion of the length of the sleeve and filling the length of the sleeve with material to be packaged; intermittently feeding the length of the sleeve filled with the material; clamping a portion of the sleeve; and severing and sealing a second end of the sleeve to thereby define a packaged bag.

DESCRIPTION OF PREFERRED EMBODIMENTS

In consideration of the above-mentioned circumstances of the prior art, it is an object of the present invention to completely cool the sealed portion in a relatively short time after heat sealing and to prevent the surface of the sealed portion from becoming rugged.

The technical means provided by the present invention for solving the above-mentioned problems includes a pair of opposed cooling members laterally disposed on the upstream or downstream side of transverse sealing devices with respect to a feeding passage for a packaging film, so that the cooling members can be opened and closed by a drive source separate from that for the transverse sealing devices. Feeding means is provided for moving a portion of the packaging film to be sealed to a position between the cooling members as the transverse sealing devices are opened.

It is preferable that the pair of cooling members are laterally disposed on the upstream side of the transverse sealing devices so that the cooling members can be opened and closed, and that the feeding means is a tuck-up guide disposed on the upstream side of the cooling members and advanced into and retracted from the feeding passage for the packaging film in conjunction with the operation of the cooling members.

In addition, the pair of cooling members may be, alternatively, laterally disposed on the downstream side of the transverse sealing devices, and the feeding means may be a delivery belt disposed at the outer periphery of a bag making cylindrical body, the delivery belt being moved in the packaging film delivery direction when the portion to be sealed of the packaging film is moved.

Further, the pair of cooling members may be, alternatively, laterally disposed on the upstream side of the transverse sealing devices, and the feeding means may be a delivery belt disposed at the outer periphery of the bag making cylindrical body, the delivery belt being moved in the direction opposite to the packaging film delivery direction when the portion to be sealed is moved.

The present invention, by the above-mentioned technical means, ensures that the sealed portion is positioned between the cooling members by the feeding means, more particularly by projecting the tuck-up guide or by re-driving the delivery belt, as the transverse sealing devices are opened immediately after heat sealing, and then the sealed portion is clamped by closing the cooling members to thereby directly cool the sealed portion.

An embodiment of the present invention will now be described with particular reference to the drawings.

Figure 1:
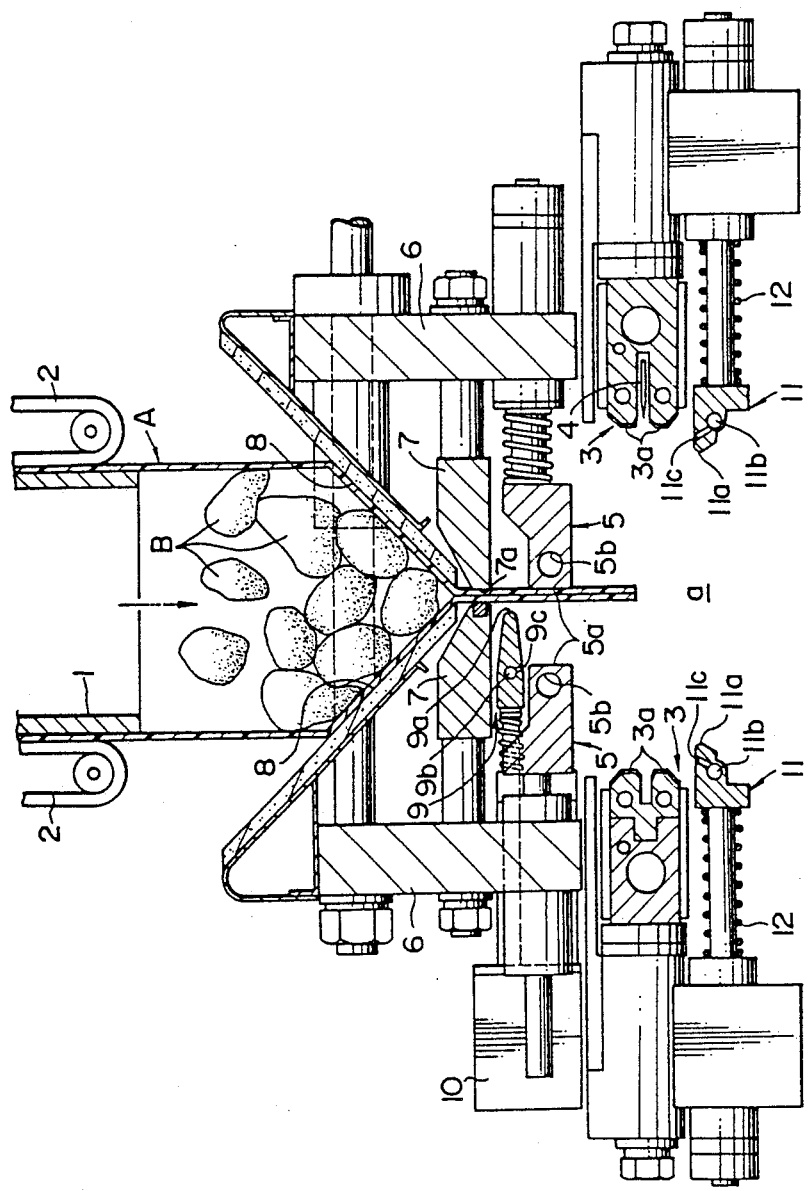
FIG. 1 is a vertical sectional side view of a bag making, filling and packaging apparatus representing one embodiment of the present invention, in an initial condition.
Figure 3:
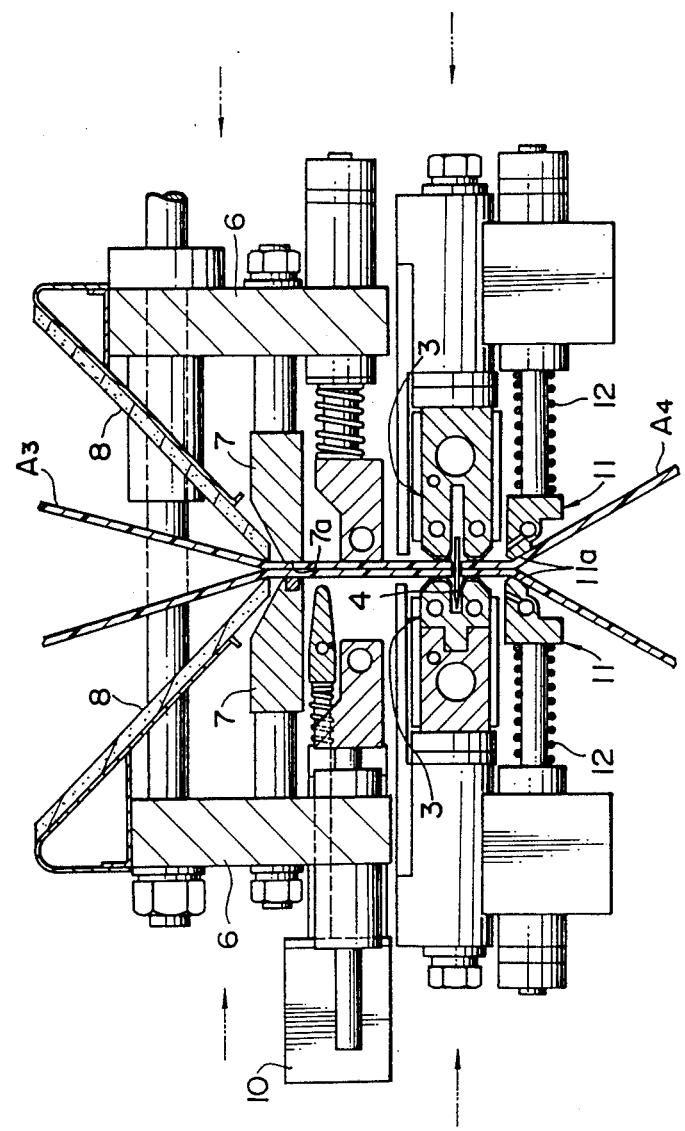
Figure 4:
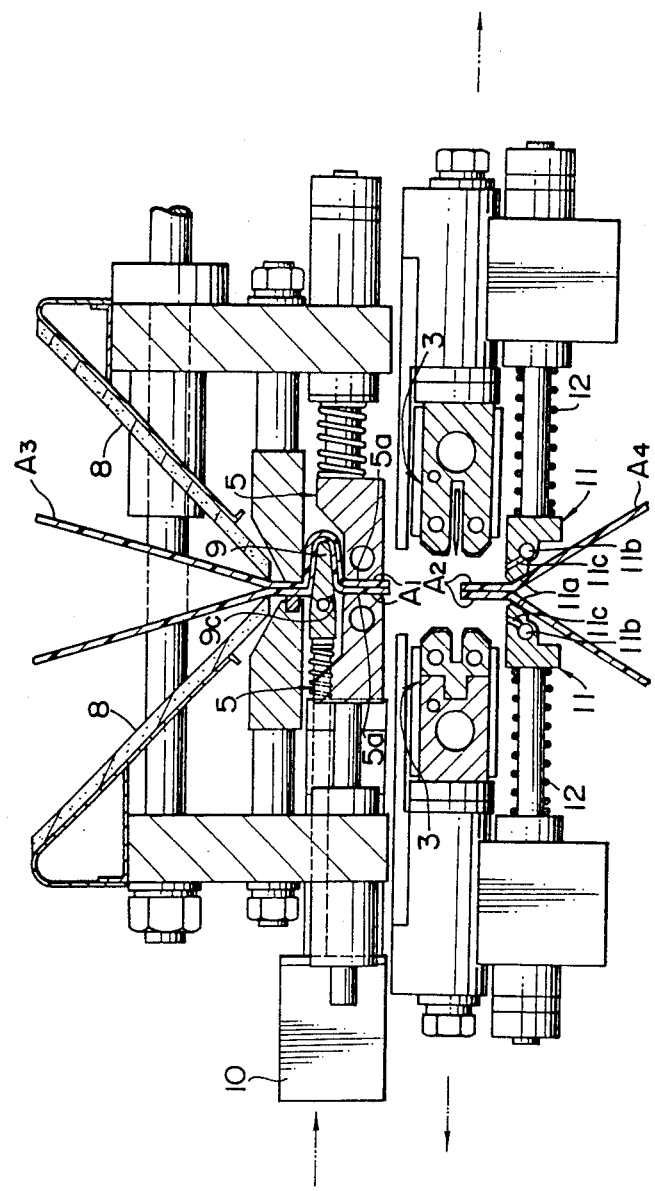

In the embodiment shown in FIG. 1, each transverse sealing device 3 is provided with a pair of sealing surfaces 3a extending substantially parallel in the packaging film delivery direction, vertical as shown, and a cutter 4 is provided between the upper and lower sealing surfaces 3a, 3a of one of the transverse sealing devices 3 so that the cutter can be advanced into and retracted from a feeding passage a for the packaging film. Two delivery belts 2, 2 disposed at the periphery of and on the opposite sides of a bag making cylindrical body are driven, whereby a packaging film A made, for example, of a thermoplastic synthetic resin such as polyethylene, is intermittently delivered by a predetermined length at a time and is formed into a tubular shape. As the transverse sealing devices 3, 3 are closed relative to each other, the packaging film A is clamped, whereby heat sealing is applied to the packaging film A in the width direction at two places in parallel at portions $A_1$, $A_2$, thereby forming bag bodies $A_3$, $A_4$, as illustrated in FIGS. 3 and 4. The cutter 4 is projected between the upper and lower sealed portions $A_1$ and $A_2$, thereby cutting the packaging film to separate the bag bodies.

On the upstream side or on the downstream side of the transverse sealing devices 3, 3 with respect to the movement of the packaging film through the feeding passage a, a pair of cooling members 5, 5 are disposed opposite to each other with the feeding passage therebetween.

Each cooling member 5 is provided at its tip surface with a vertical smooth cooling surface 5a having a lateral size approximately equal to the lateral width of the sealing surface 3a of the transverse sealing device 3, and is provided therein with a passage 5b bored proximate and along the cooling surface 5a for supplying cooling water or cooling air. The cooling members 5, 5 are fixed, respectively, to a pair of movable bodies 6, 6 laterally disposed so as to be capable of being opened and closed in the same direction as the moving direction of the transverse sealing devices 3, 3 by a drive source (not shown) separate from that for the transverse sealing devices 3, 3, with each cooling surface 5a facing the feeding passage a for the packaging film.

In the embodiment illustrated, the cooling members 5, 5 are disposed on the upstream side, namely, the upper side of the transverse sealing devices 3, 3, and each movable body 6 is provided with an upper clamp 7 provided with a pressing surface 7a at its end on the side of the feeding passage a for the packaging film, and is also provided with a packaged material holder 8 gradually slanted downstream as the feeding passage a is approached. The upper clamps 7 can contact and separate from each other, and the packaged material holders 8 can contact and separate from each other as the moving bodies 6 are reciprocated. In an initial state, the cooling surface 5a of one of the cooling members 5 is retracted from the feeding passage a for the packaging film, as compared with the pressing surface 7a of the upper clamp 7 disposed on one movable body 6, whereas the cooling surface 5a of the other cooling member 5 is disposed to be substantially flush with the pressing surface 7a on the other movable body 6.

The feeding passage a for the packaging film is provided with a feeding device for moving the upstream-side sealed portion $a_1$ of the packaging film A to the side of the cooling members 5, 5.

The feeding device, in this embodiment, is a tuck-up guide 9 laterally disposed on the upstream side of one of the cooling members 5, which is retracted from the feeding passage a for the packaging film. This one of the cooling members 5 and the tuck-up guide 9 can be advanced into and retracted from the feeding passage a for the packaging film by a drive source 10 such as, for instance, an air cylinder, separate from the drive source for the cooling members 5, 5.

The tuck-up guide 9 is provided in the form of a strip having a lateral width approximately equal to the lateral width of the cooling surface 5a of the cooling member 5, and upper and lower surfaces thereof on the side of the feeding passage a for the packaging film are slanted in a tapered manner so that the material thickness of the guide 9 is gradually reduced as the feeding passage a is approached. The tip edge 9a of the tuck-up guide 9, in the mounted state thereof protrudes toward the feeding passage a for the packaging film beyond the cooling surface 5a of the one of the cooling members 5 which is retracted, and is disposed to be flush with the pressing surface 7a of one of the upper clamps 7.

The tuck-up guide 9 is provided therein with an air passage 9b bored along the tip edge 9a for supplying compressed air, and a plurality of jet holes 9c are bored from the air passage 9b toward the front side of the cooling surface 5a of the retracted cooling member 5.

Further, on the downstream side of each of the transverse sealing devices 3, a lower clamp 11 provided with a pressing portion 11a at its end on the side of the feeding passage a for the packaging film is disposed so as to be movable in the same direction as the moving direction of the transverse sealing devices 3, 3. Each lower clamp 11 is so disposed that the pressing portion 11a thereof is protruded toward the feeding passage a beyond the sealing surface 3a at the time of maximum projection. Each pressing portion 11a is constantly elastically pushed towards the feeding passage a by an elastic member 12 such as a spring.

Each pressing portion 11a is provided therein with an air passage 11b for supplying cooling air, and a plurality of ejection holes 11c are bored from the air passage 11b toward the front side of the downstream-side sealing surface 3a.

The operation of the bag making, filling and packaging apparatus will now be explained.

First, as shown in FIG. 1, the movable bodies 6, 6 are closed relative to each other to clamp the packaging film A immovably between the pressing surfaces 7a, 7a of the upper clamps 7, 7. In this condition, filling of the packaging film with a material to be packaged B is started, and the material B is supported by the packaged material holders 8, 8.

Figure 2:
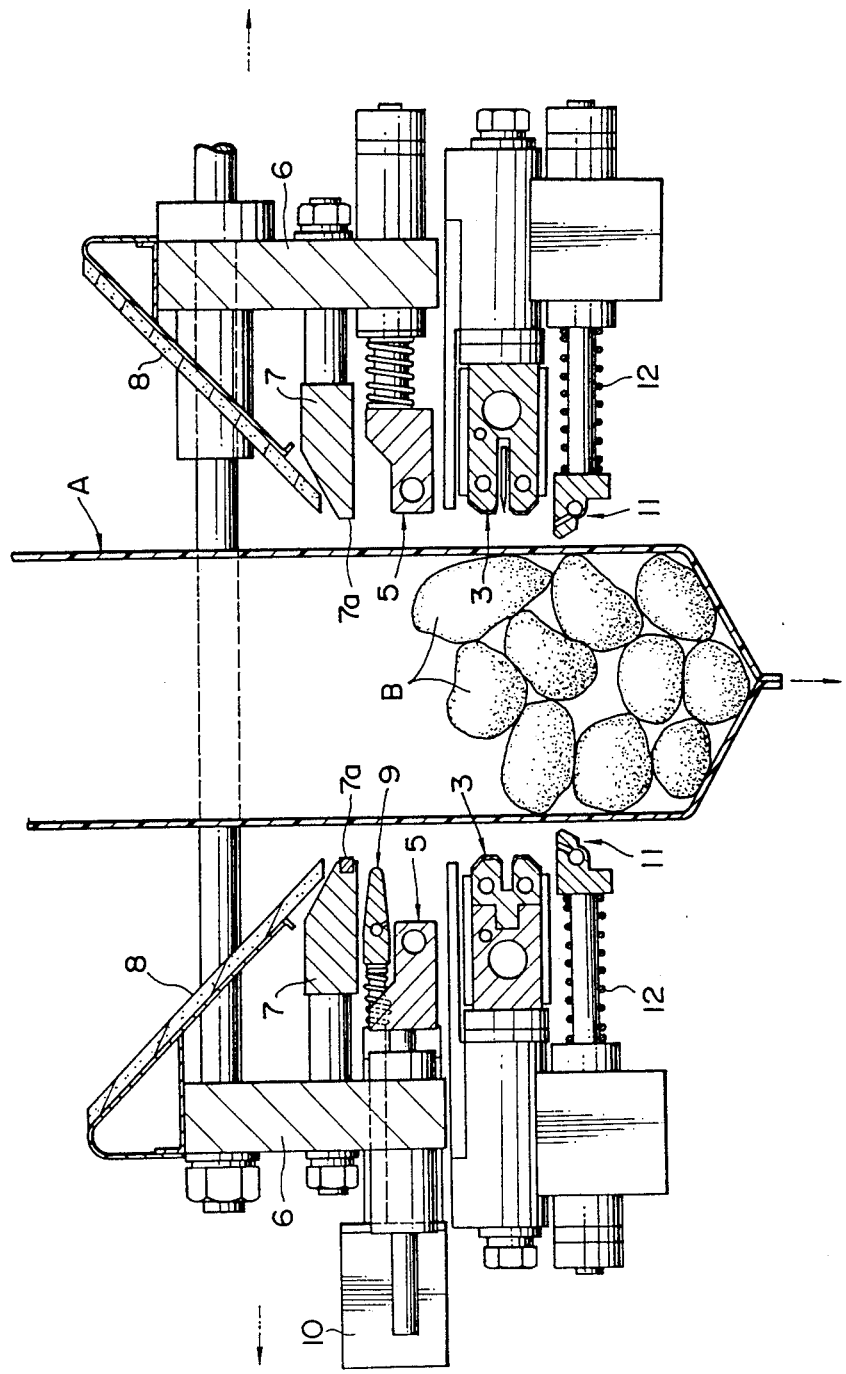
FIGS. 2, 3, and 4, are vertical sectional side views showing the various sequential operating stages of the apparatus.

Thereafter, as shown in FIG. 2, the movable bodies 6, 6 are moved relative to each other to release the clamping force of the upper clamps 7, 7, and the delivery belts 2, 2 are driven to deliver the packaging film A by a predetermined distance.

When the delivery of the packaging film A is finished, and as shown in FIG. 3, the transverse sealing devices 3, 3 are closed relative to each other to heat seal the film at two places in parallel. After the downstream-side bag body $A_4$ is clamped immovably between the pressing portions 11a, 11a of the lower clamps 11, 11, the cutter 4 is advanced to cut apart the upper and lower bag bodies $A_3$ and $A_4$.

Simultaneously with or after this operation, the movable bodies 6, 6 are closed relative to each other to clamp the upstream-side bag body $A_3$ immovably between the pressing surfaces 7a, 7a of the upper clamp 7, 7.

Subsequently, opening of the transverse sealing devices 3, 3 is started and, simultaneously, the drive source 10, such as an air cylinder, is driven to advance the tuck-up guide 9 and the retracted cooling member 5 toward the downstream end of upstream bog body $A_3$, as shown in FIG. 4.

The tuck-up guide 9 first comes into contact with the upstream bag body $A_3$ and folds the end of bag body $A_3$ into a substantially U-shaped form. This is accompanied by an upward movement of the sealed portion $A_1$ formed at the lower end of the bag body $A_3$.

At this time, compressed air is ejected from the jet holes 9c of the tuck-up guide 9 to push up the sealed portion $A_1$. Then the cooling surface 5a of one of the cooling members 5 makes contact with the sealed portion $A_1$ thus tucked up, and clamps the sealed portion $A_1$ together with the cooling surface 5a of the other cooling member 5, thereby cooling the sealed portion $A_1$.

Even when the opening of the transverse sealing devices 3, 3 is started, the downstream bag body $A_4$ remains clamped by the pressing portions 11a, 11a of the lower clamp 11, 11 by the force of the elastic members 12, 12. In this condition, cooling air is ejected from the ejection holes 11c, 11c of the pressing portions 11a, 11a to cool the sealed portion $A_2$ formed at the upper end of the bag body $A_4$.

Thereafter, only the tuck-up guide 9 and one of the cooling members 5 are retracted, resulting in the initial state, and the above process is repeated or the operation is stopped in this condition.

Thus, in this embodiment, the cooling members 5, 5 in the stopped state are located apart from the transverse sealing devices 3, 3 to avoid heat transfer to the cooling members 5, 5 from the transverse sealing devices 3, 3. The temperature of the cooling bodies 5 is therefore prevented from being raised.

Although the feeding device for moving the sealed portion $A_1$ between the cooling members 5, 5 is the tuck-up guide in the above embodiment, the invention is not limited to such an arrangement. Alternatively, the delivery belts 2, 2 may be re-driven to move the sealed portion $A_1$ to a position between the cooling members 5, 5.

In that case, the cooling members 5, 5 are disposed on the downstream side of the transverse sealing devices 3, 3 if the delivery belts 2, 2 are driven in the packaging film delivery direction, to position the sealed portion $A_1$ between the cooling members 5, 5. If the delivery belts 2, 2 are driven in the opposite direction, the cooling members 5, 5 are instead, disposed on the upstream side of the transverse sealing devices 3, 3.

Alternatively, compressed air may be jetted to the packaging film A to move the sealed portion $A_1$ to the position between the cooling members 5, 5.

Furthermore, although only the sealed portion $A_1$ at the lower end of the bag body $A_3$ is cooled by the cooling members 5, 5 in the above embodiment, it is also contemplated that the sealed portion $A_2$ at the upper end of the bag body $A_4$ can also be cooled in the same manner.

The present invention, as described above, has the following advantages.

Since the sealed portion is cooled directly by the cooling members closed relative to each other after the sealed portion is positioned between the cooling members by the feeding device, more particularly by projecting the tuck-up guide or by re-driving the delivery belts immediately after heat sealing, it is possible to completely cool the sealed portion in a short time after the heat sealing and to prevent the surface of the sealed portion from becoming rugged. A smooth, effective seal is provided.

Therefore, it is possible to operate the apparatus at a higher speed, to securely prevent the delamination of the sealed portion to obtain a better appearance of the surface of the sealed portion, and to further enhance the sealing effect, as compared to the prior art system in which the sealed portion is cooled by cooling air.

Although the invention has been disclosed as utilizing particular means, elements, and structural details, the invention is not to be limited thereto, but extends to all equivalents embraced by the claims as set forth below.

What is claimed is:

1. A bag making apparatus comprising means for intermittently delivering a packaging film by a predetermined length at a time, while forming the film into a tubular shape by a bag making cylindrical body and for permitting said tubular packaging film to be filled with a material to be packaged, further comprising a transverse sealing device on either side of a feeding passage for said packaging film, a drive device for moving said sealing devices toward and away from said feeding passage, a pair of opposed cooling members disposed on the upstream side of said transverse sealing devices, a second drive device for moving said cooling members toward and away from said feeding passage separate from said first drive device for said transverse sealing devices, and a feeding device provided for moving a sealed portion of said packaging film to a position between said cooling members as said transverse sealing devices are moved away from said feeding passage.

2. The apparatus as set forth in claim 1, wherein said feeding device is a tuck-up guide which contacts said packaging film and is disposed on the upstream side of said cooling members and advanced into and retracted from said feeding passage for the packaging film in conjunction with said cooling members.

3. The apparatus as set forth in claim 1, wherein the feeding device is a delivery belt disposed at the outer periphery of said bag making cylindrical body, said delivery belt being moved in the direction opposite to the packaging film delivery direction when the portion to be sealed is to be moved.

4. An apparatus for sealing and closing an end of a sleeve comprising:
   means for heat sealing a first portion of said end of said sleeve of material for closing said end;
   means for moving said sealing means toward and away from said end of said sleeve of material;
   means for cooling said end of said sleeve after it is sealed by said sealing means, said means for cooling being disposed on the upstream side of said means for heat sealing;
   means for moving said cooling means toward and away from said end of said sleeve of material, said means for moving said cooling means being independent of said means for moving said sealing means and;
   means for feeding said first portion of said end of said sleeve of material to a position adjacent said cooling means after said first portion of said end is sealed.

5. The apparatus of claim 4 wherein said cooling means is configured and arranged to contact said first portion of said end of said sleeve.

6. The apparatus of claim 5 wherein said cooling means comprises at least one cooling member having a passage therein for a liquid or gaseous cooling fluid for cooling said at least one cooling member.

7. The apparatus of claim 4 wherein said cooling means comprises a pair of opposed cooling members which are operatively associated with said moving means therefor for movement between an extended cooling position in which said pair of cooling members are moved together and said end of said sleeve is engaged between said pair of cooling members, and a retracted position in which said pair of cooling members are moved apart from said extended position.

8. The apparatus of claim 4 further comprising means for advancing said sleeve of material in a direction along a feeding passage.

9. The apparatus of claim 8 wherein said advancing means is independent of said means for feeding said first portion of said end of said sleeve.

10. The apparatus of claim 9 where in said feeding means is mounted for movement transverse to said feeding passage.

11. The apparatus of claim 10 wherein said feeding means is configured and arranged to engage a further portion of said sleeve to thereby move said first portion of said end of said sleeve in a direction opposite to said direction along said feeding passage.

12. The apparatus of claim 11 wherein said feeding means is mounted for movement with at least a portion of said cooling means.

13. The apparatus of claim 11 wherein said feeding means is mounted for movement on a portion of said cooling means such that said feeding means engages said sleeve before said portion of said cooling means engages said sleeve.

14. The apparatus of claim 8 wherein said means for feeding said first portion of said end of said sleeve comprises said advancing means.

15. The apparatus of claim 14 wherein said advancing means is operable to move said end of said sleeve in said direction along said feeding passage to said position adjacent said cooling means after said portion of said end is sealed.

16. The apparatus of claim 14 wherein said advancing means is operable to move said end of said sleeve in a direction reverse to that of said direction along said feeding passage to said position adjacent said cooling means after said first portion of said end is sealed.

17. The apparatus of claim 4 further comprising means for intermittently feeding said sleeve of material in a direction along a feeding passage from an upstream position to a downstream position.

18. The apparatus of claim 17 wherein said intermittent feeding means is configured and arranged for feeding a continuous length of said sleeve of material.

19. The apparatus of claim 17 further comprising means for clamping a further portion of said sleeve upstream of said first portion.

20. The apparatus of claim 19 further comprising means for cutting said sleeve downstream of said clamping means for defining said end of said sleeve.

21. The apparatus of claim 10 wherein said cutting means further defines an upstream end of a downstream sleeve, and wherein said apparatus further comprises means for sealing and means of cooling said upstream end of said downstream sleeve.

22. The apparatus of claim 21 further comprising means located upstream of said clamping means for supporting an outer surface of said sleeve and for holding material inserted within said sleeve.

23. A method of closing and sealing an end of a sleeve comprising:
positioning a sleeve along a feeding passage from an upstream to a downstream side;
heat sealing an end of said sleeve with a heat sealing device;
moving said heat sealed end of said sleeve upstream to proximate a cooling device; and
moving a cooling device toward said heat sealed end of said sleeve for cooling said end.

24. The method of claim 23 further comprising moving said heat sealing device away from said end of said sleeve before said step of cooling said heat sealed end of said sleeve is completed.

25. The method of claim 23 wherein said step of moving a cooling device comprises engaging said heat sealed end of said sleeve with said cooling device.

26. The method of claim 23 wherein said step of moving said heat sealed end of said sleeve proximate a cooling device comprises feeding a portion of said sleeve upstream of said heat sealed end transverse of said feeding passage.

27. The method of claim 23 wherein said step of positioning said sleeve comprises feeding said sleeve in a downstream direction along said feeding passage.

28. The method of claim 27 wherein said step of moving said heat sealed end of said sleeve proximate a cooling device comprises moving said sleeve in a direction opposite to said downstream direction.

* * * * *